United States Patent
Murata et al.

(10) Patent No.: US 8,838,342 B2
(45) Date of Patent: Sep. 16, 2014

(54) FUEL CELL SAFETY SYSTEM FOR VEHICLES

(75) Inventors: Kazuya Murata, Okazaki (JP); Tomoaki Nakashima, Toyota (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 1259 days.

(21) Appl. No.: 12/668,594

(22) PCT Filed: Jul. 10, 2008

(86) PCT No.: PCT/JP2008/062961
§ 371 (c)(1),
(2), (4) Date: Jan. 11, 2010

(87) PCT Pub. No.: WO2009/011404
PCT Pub. Date: Jan. 22, 2009

(65) Prior Publication Data
US 2010/0191425 A1    Jul. 29, 2010

(30) Foreign Application Priority Data
Jul. 13, 2007    (JP) .................. 2007-184103

(51) Int. Cl.
| B60R 22/00 | (2006.01) |
| E05F 15/00 | (2006.01) |
| G05D 1/00 | (2006.01) |
| G05D 3/00 | (2006.01) |
| G06F 7/00 | (2006.01) |
| G06F 17/00 | (2006.01) |
| B60R 21/0132 | (2006.01) |
| B60W 20/00 | (2006.01) |
| B60R 21/01 | (2006.01) |

(52) U.S. Cl.
CPC ............ *B60R 21/0132* (2013.01); *B60W 20/00* (2013.01); *B60R 2021/01184* (2013.01)
USPC ......... 701/45; 701/1; 701/36; 701/22; 701/48

(58) Field of Classification Search
USPC .......................................... 280/735; 180/282
See application file for complete search history.

(56) References Cited

U.S. PATENT DOCUMENTS

| 5,346,778 A * | 9/1994 | Ewan et al. ................... 429/415 |
| 6,536,551 B1 * | 3/2003 | Tanaka et al. ................. 180/271 |

(Continued)

FOREIGN PATENT DOCUMENTS

| DE | 199 50 008 A1 | 4/2001 |
| DE | 100 52 174 A1 | 5/2001 |
| DE | 100 06 781 A1 | 3/2002 |
| DE | 103 61 647 A1 | 8/2005 |

(Continued)

*Primary Examiner* — Bhavesh V Amin
(74) *Attorney, Agent, or Firm* — Kenyon & Kenyon LLP

(57) ABSTRACT

A mobile body capable of improving the accuracy of collision judgment. The mobile body including a fuel cell system has a first sensor which detects a physical quantity concerning the moving state of the mobile body, a second sensor which detects a physical quantity concerning the operation state of the fuel cell system, and a judgment section which receives detection signals from the first and second sensors to judge the presence of the collision of the mobile body based on the two detection signals. The judgment section can change a threshold value to be compared with the detected value of the first sensor in accordance with the detected value of the second sensor, to judge the presence of the collision of the mobile body. The first sensor can be constituted of an acceleration sensor, and the second sensor can be constituted of a gas pressure sensor or the like.

8 Claims, 2 Drawing Sheets

(56) References Cited

U.S. PATENT DOCUMENTS

| | | | |
|---|---|---|---|
| 6,591,924 B2* | 7/2003 | Shimizu | 180/65.1 |
| 7,090,943 B2* | 8/2006 | Meredith et al. | 429/427 |
| 7,363,997 B2* | 4/2008 | Sato et al. | 180/65.31 |
| 2002/0094468 A1* | 7/2002 | Miura et al. | 429/34 |
| 2004/0146755 A1* | 7/2004 | Meredith et al. | 429/13 |
| 2004/0247962 A1* | 12/2004 | Toukura | 429/22 |
| 2005/0184495 A1* | 8/2005 | Zerbe | 280/735 |
| 2007/0000702 A1* | 1/2007 | Yoshida et al. | 180/65.3 |

FOREIGN PATENT DOCUMENTS

| | | |
|---|---|---|
| DE | 10 2007 029 715 A1 | 1/2009 |
| JP | 2001-119815 A | 4/2001 |
| JP | 2001-357863 A | 12/2001 |
| JP | 2004-349110 A | 12/2004 |
| JP | 2005-508791 A | 4/2005 |
| JP | 2006-182300 A | 7/2006 |
| WO | WO 03/042006 A1 | 5/2003 |
| WO | WO 2009/000363 A1 | 12/2008 |

* cited by examiner

FUEL CELL SAFETY SYSTEM FOR VEHICLES

This is a 371 national phase application of PCT/JP2008/062961 filed 10 Jul. 2008, which claims priority to Japanese Patent Application No. 2007-184103 filed 13 Jul. 2007, the contents of which are incorporated herein by reference.

TECHNICAL FIELD

The present invention relates to a collision judgment technology.

BACKGROUND ART

In a mobile body such as a fuel cell vehicle on which a fuel cell system is installed, a collision sensor such as a G-sensor, that is an acceleration sensor, is usually provided to detect the collision of the mobile body (see JP 2001-119815 A, JP 2004-349110 A, JP 2001-357863 A, and JP 2006-182300 A). In the mobile body disclosed in JP 2001-119815 A, when the collision sensor detects the collision of the vehicle, as a subsequent countermeasure, the development of an airbag and the stopping of hydrogen supply to a fuel cell are executed. In this case, as a certain example, an acceleration sensor for use in an airbag system is used as the collision sensor to judge the presence of the collision from the detection signal of the collision sensor. Moreover, in another example, acceleration sensors installed in a hydrogen storage tank and a fuel cell stack are also used as collision sensors to judge the presence of the collision from the detection signal of at least one of three acceleration sensors.

The vehicle sometimes experiences impact owing to road surface interference or the like during traveling, instead of the collision. In a case where the presence of the collision is judged only by use of the detection signal of one acceleration sensor as in JP 2001-119815 A, the road surface interference or the like might be wrongly judged as the "collision" and, as a result, the development of the airbag might be executed. When a threshold value for use in judging the collision is set to be large, the wrong judgment can be prevented, but in this case, the missing of the detection might occur. Such a problem is similarly feared even in a case where the detection signals of three acceleration sensors which are same type are individually and independently used. Therefore, it cannot be said that in a conventional technology, the collision judgment as a trigger for executing the collision countermeasure has sufficiently been investigated.

DISCLOSURE OF THE INVENTION

An object of the present invention is to provide a mobile body capable of increasing the accuracy of collision judgment.

The mobile body according to the present invention for achieving the object comprises: a fuel cell system; a first sensor which detects a physical quantity concerning the moving state of the mobile body; a second sensor which detects a physical quantity concerning the operation state (hereinafter referred to simply as the "system operation state") of the fuel cell system; and a judgment section which judges the presence of the collision of the mobile body based on two detection signals received from the first sensor and the second sensor.

For example, when the mobile body collides, a physical quantity such as a gas pressure or a water pressure in the fuel cell system decreases, and hence the system operation state becomes abnormal. On the other hand, when the mobile body receives not the collision but road surface interference or the like, the system operation state can be kept to be normal. According to the collision judgment of the present invention, the abnormality or normality of the system operation state is considered in addition to the detection result of the first sensor. Therefore, in the whole mobile body, the wrong judgment due to the road surface interference or the like is inhibited, and the missing of the detection feared in a case where a threshold value is large can be inhibited. Moreover, it is possible to prevent the wrong judgment in a case where one of the first and second sensors has a failure or the like. Accordingly, the accuracy of the collision judgment can be improved.

Here, the "physical quantity concerning the moving state of the mobile body" is the speed, acceleration or deceleration of the mobile body itself, or a physical quantity indicating the driving state of a driving source which can be mounted on the mobile body or the like. When the driving source is a motor, the physical quantity includes a motor rotation number and a motor torque.

The first sensor includes a speed sensor, an acceleration sensor, a strain sensor, a pressure sensitive sensor, an ultrasonic sensor and a laser radar sensor. Among these sensors, the acceleration sensor which detects the acceleration of the mobile body is preferable. In this case, when a sensor such as an airbag sensor installed for another application is also used as the acceleration sensor, the number of components can be decreased.

The "physical quantity concerning the system operation state" is the pressure, flow rate, temperature, concentration or flow speed of oxidizing gas or fuel gas, which are hereinafter generically referred to as the "reaction gas," or cooling water, the current output or voltage output of a fuel cell or the like.

The sensor may detect what easily changes during the collision of the mobile body. Considering that a gas pipe or a cooling water pipe might be damaged during the collision, the second sensor may preferably be a gas pressure sensor which detects the pressure of the reaction gas flowing through a gas pipe in the fuel cell system, a gas concentration sensor which detects the concentration of the reaction gas in the fuel cell system, or a water pressure sensor which detects the pressure of cooling water flowing through a cooling pipe in the fuel cell system.

According to one aspect of the present invention, the judgment section may change a threshold value to be compared with the detected value of the first sensor in accordance with the detected value of the second sensor, to judge the presence of the collision of the mobile body.

According to this constitution, an optimum threshold value can be set in accordance with the system operation state. Therefore, as compared with a case where the detected values of the first and second sensors are separately and independently used in the collision judgment, the accuracy of the collision judgment can be improved.

Preferably, the judgment section may use a first threshold value as the threshold value to be compared with the detected value of the first sensor in a case where the detected value of the second sensor is a value indicating the abnormality of the fuel cell system, whereas the judgment section may use a second threshold value larger than the first threshold value as the threshold value to be compared with the detected value of the first sensor in a case where the detected value of the second sensor is a value indicating the normality of the fuel cell system.

According to this constitution, when any abnormality of the system operation state is not detected, a comparatively large threshold value, that is the first threshold value, can be set, so that the wrong detection of the first sensor due to road surface interference or the like can be inhibited. In a case where the abnormality of the system operation state is detected, it can accordingly be judged that there is a high possibility of collision, so that the threshold value may be set to a threshold value, which is the second threshold value, smaller than the first threshold value. Therefore, the missing of the detection feared in a case where the threshold value is large can be inhibited.

According to another aspect of the present invention, the mobile body may comprise an airbag and an airbag control section which controls the operation of the airbag. Moreover, the airbag control section may expand the airbag in a case where the judgment section judges that the collision of the mobile body is present.

According to this constitution, the accuracy of the collision judgment as a trigger for operating the airbag improves, so that the wrong operation of the airbag is inhibited and the airbag can surely be expanded during the collision.

According to still another aspect of the present invention, the mobile body may comprise a system control section which controls the operation of the fuel cell system. In a case where the judgment section judges that the collision of the mobile body is present, the system control section may execute at least one of the following types of processing of:

(a) stopping the operation of the fuel cell system;

(b) stopping the supply of reaction gas to a fuel cell in the fuel cell system; and (c) electrically blocking the fuel cell in the fuel cell system from another electric system.

According to this constitution, during the collision, the fuel cell system and the fuel cell can surely be stopped, and the leakage of the reaction gas can be inhibited. Furthermore, the short circuit of the electric system, the disconnection of wires or the like due to contact or the like can be inhibited.

According to a further aspect of the present invention, the mobile body may comprise a system control section configured to execute a plurality of types of processing in the fuel cell system in a case where the judgment section judges that the collision of the mobile body is present. Moreover, the judgment section may compare the detected value of the first sensor with the threshold value which varies in accordance with each of the plurality of types of processing, to judge whether or not to execute each type of processing. Moreover, the system control section may execute the processing which is judged to be executed by the judgment section.

According to a further aspect of the present invention, the mobile body may comprise a third sensor which is other than the first sensor and which detects a physical quantity concerning the moving state of the mobile body. Moreover, the judgment section may compare, with the threshold value which varies in accordance with each of the plurality of types of processing, the detected value of the third sensor instead of the detected value of the first sensor, to judge whether or not to execute each type of processing, and the system control section may execute the processing which is judged to be executed by the judgment section.

According to such a constitution, in a case where it is judged that the collision is present, necessary collision countermeasure processing (e.g., one of the above processing (a) to (c)) can effectively be performed in accordance with the moving state of the mobile body.

Another mobile body for achieving the above object according to the present invention comprises: first and second sensors of the same type which are provided in positions different from each other; and a judgment section which judges the presence of the collision of the mobile body based on two detection signals received from the first and second sensors. The first and second sensors detect a physical quantity concerning the moving state of the mobile body. The judgment section changes a threshold value to be compared with the detected value of one of the first and second sensors in accordance with the detected value of the other sensor, to judge the presence of the collision of the mobile body.

According to this constitution, an optimum threshold value can be set in accordance with a position where a sensor is arranged. Therefore, as compared with a case where the detected values of the first and second sensors are separately and independently used in the collision judgment, the accuracy of the collision judgment can be improved. In addition, the wrong judgment can be prevented when one of the first and second sensors has a failure or the like.

BEST MODE FOR CARRYING OUT THE INVENTION

A mobile body according to a preferable embodiment of the present invention will hereinafter be described in accordance with a fuel cell vehicle with reference to the accompanying drawings.

First Embodiment

Figure 1:
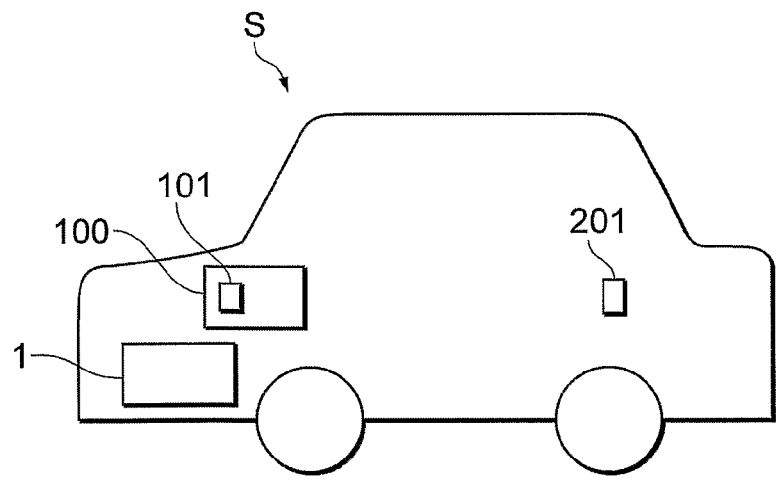
FIG. 1 is a side view showing a mobile body according to an embodiment.

As shown in FIG. 1, a fuel cell system 1 and an airbag system 100 are installed on a fuel cell vehicle S, which is hereinafter referred to simply as the "vehicle S," according to the present embodiment. The whole control of the vehicle S, for example, the control of the fuel cell system 1 and the airbag system 100 is performed by a controller 6 which is a vehicle ECU (see FIG. 2). In addition, a controller for exclusive use in controlling the airbag system 100 may be provided separately from the vehicle ECU.

Figure 2:
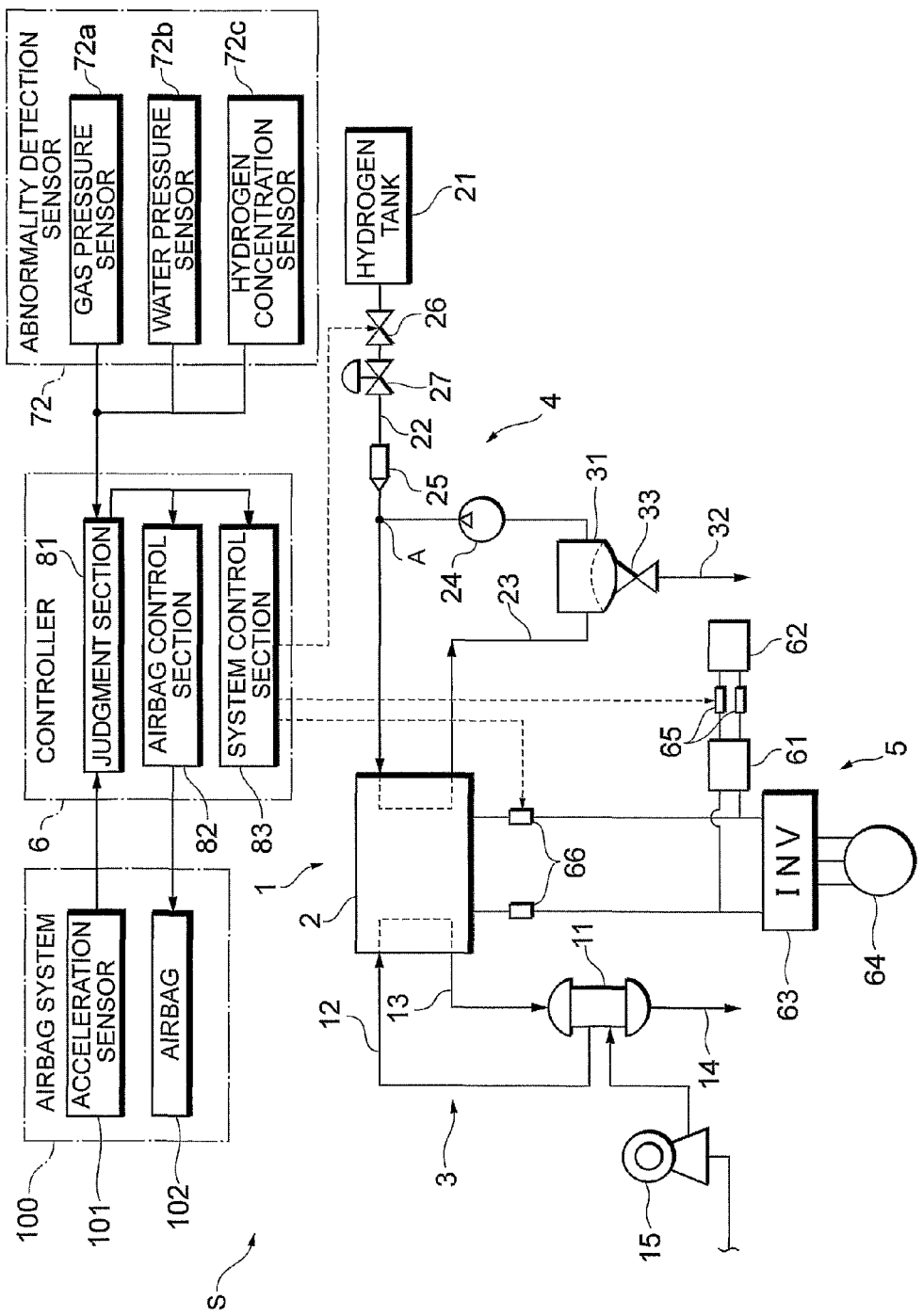
FIG. 2 is a block diagram showing a fuel cell system installed on the mobile body according to the embodiment.

As shown in FIG. 2, the airbag system 100 includes an acceleration sensor 101 and an airbag 102. The acceleration sensor 101 is a so-called G-sensor, and has, for example, one or both of functions of a vertical G-sensor which detects the acceleration of the vehicle S in a vertical direction and a front/rear left/right G-sensor which detects the acceleration of the vehicle S in a front-to-rear direction and a vehicle width direction. The acceleration sensor 101 detects the acceleration of the vehicle S generated owing to the collision of the vehicle S or the like, and this detected acceleration is used in collision judgment.

The airbag 102 is provided in, for example, a steering handle in the driver seat of the vehicle S or an instrument panel in front of the passenger seat of the vehicle. The airbag 102 operates based on the control instruction of the controller 6, and expands so as to be developed into a predetermined size. The expanded airbag 102 has elasticity and impact absorption force, and can protect passengers in the vehicle S from the impact during the collision.

The fuel cell system 1 includes a fuel cell 2, an oxygen gas piping system 3, a fuel gas piping system 4, and a power system 5.

The fuel cell 2 is constituted of, for example, a solid polymer electrolytic type, and receives the supply of oxygen gas and fuel gas to generate a power. The oxygen gas and the fuel gas are generically referred to as reaction gas. Also, the oxygen gas and fuel gas discharged from the fuel cell 2 are generically referred to as oxygen off gas and fuel off gas, and these gases are generically referred to as reaction off gas. Air will hereinafter be described as an example of the oxygen gas, and hydrogen gas will be described as an example of the fuel gas.

The oxygen gas piping system 3 has a humidifier 11, a supply pipe 12, a discharge pipe 13, an exhaust pipe 14, and a compressor 15. The atmospheric air, which is the oxygen gas, introduced by the compressor 15 flows through the supply pipe 12, is fed under pressure to the humidifier 11, is humidified by the humidifier 11 and is supplied to the fuel cell 2. The oxygen off gas flows through the discharge pipe 13, is introduced into the humidifier 11, then flows through the exhaust pipe 14, and is discharged from the system.

The fuel gas piping system 4 has a hydrogen tank 21, a supply pipe 22, a circulation pipe 23, a pump 24, and an injector 25. The hydrogen tank 21 is a hydrogen supply source in which the hydrogen gas having a high pressure is stored. At a joining part A between the supply pipe 22 and the circulation pipe 23, new hydrogen gas from the hydrogen tank 21 joins hydrogen off gas fed under pressure by the pump 24, and this mixed hydrogen gas flows through the supply pipe 22, and is supplied to the fuel cell 2. On an upstream side from the joining part A, the injector 25, a shut valve 26 and a regulator 27 are provided. The shut valve 26 functions as the source valve of the hydrogen tank 21. The circulation pipe 23 is provided with a gas-liquid separator 31 in addition to the pump 24. The gas-liquid separator 31 separates water included in the hydrogen off gas. A purge valve 33 is opened to discharge, to a downstream side from a drain path 32, the separated water together with a part of the hydrogen off gas including impurities. In consequence, the decrease of the hydrogen concentration of the hydrogen gas to be circulated to the fuel cell 2 can be inhibited.

The power system 5 has a high-voltage DC/DC converter 61, a battery 62, a traction inverter 63, a traction motor 64 and the like. The high-voltage DC/DC converter 61 realizes the charging or discharging of the battery 62, and controls the output voltage of the fuel cell 2. The traction inverter 63 converts a direct current input via the high-voltage DC/DC converter 61 into a three-phase alternating current to supply the current to the traction motor 64. The traction motor 64 is, for example, a three-phase alternating current motor, and is a main driving source for the vehicle S. The traction motor 64 functions as a load device which consumes the power during the traveling of the vehicle S, but functions as a power generator during braking.

A high-voltage relay 65 is provided between the high-voltage DC/DC converter 61 and the battery 62. Moreover, a high-voltage relay 66 is provided between the high-voltage DC/DC converter 61 and the fuel cell 2. The high-voltage relay 65 is opened to electrically block the battery 62 from another electric system (the high-voltage DC/DC converter 61). The high-voltage relay 66 is opened to electrically block the fuel cell 2 from another electric system (the high-voltage DC/DC converter 61, the battery 62 and the traction inverter 63).

The controller 6 is constituted as a microcomputer including a CPU, an ROM, and an RAM. The CPU executes desired computation in accordance with a control program to perform various operations and control such as collision judgment described later and collision countermeasure processing based on the judgment. The ROM stores the control program or control data to be processed by the CPU. The RAM is used as any type of operation region for control processing.

The controller 6 inputs a sensor signal from an accelerator pedal sensor which detects the open degree of an accelerator pedal of the vehicle S or the like, and inputs sensor signals from various sensors which detect a physical quantity concerning the moving state of the vehicle S. For example, a vehicle speed sensor, an acceleration sensor, a deceleration sensor and the like detect the vehicle speed, acceleration and deceleration of the vehicle S as the physical quantities concerning the moving state of the vehicle S. Moreover, the rotation number, torque and the like of the traction motor 64 are also detected as the physical quantities concerning the moving state of the vehicle S.

The acceleration sensor 101 for the airbag may be used as the acceleration sensor. In the collision judgment described later, an example in which the acceleration sensor 101 is used will be described. However, the sensors which detect the physical quantities as described above may be used alone or as a combination thereof.

The controller 6 also inputs a sensor signal from an abnormality detection sensor 72 which detects a physical quantity concerning the operation state of the fuel cell system 1. This physical quantity includes the pressure, flow rate, temperature, concentration or flow speed of the reaction gas or cooling water, and the current output or voltage output of the fuel cell 2. Sensors which detect these physical quantities are generically referred to as the abnormality detection sensor 72. The abnormality detection sensor 72 includes a gas pressure sensor 72a which detects the pressure of the reaction gas, a water pressure sensor 72b which detects the pressure of the cooling water for cooling the fuel cell 2, and a hydrogen concentration sensor 72c which detects the concentration of the hydrogen gas.

The gas pressure sensor 72a is provided with at least one of the supply pipe 12, the discharge pipe 13, the supply pipe 22 and the circulation pipe 23. The water pressure sensor 72b is provided with a cooling pipe (not shown) which circulates the cooling water through the fuel cell 2. The hydrogen concentration sensor 72c detects the leakage of the hydrogen gas from the supply pipe 22, the circulation pipe 23 or the like. In the collision judgment described later, the detection signals from one or more abnormality detection sensors 72 are used.

The controller 6 centrally controls the vehicle S based on various input sensor signals. In particular, the controller 6 has a judgment section 81, an airbag control section 82, and a system control section 83 as functional sections for executing the collision judgment, the subsequent collision countermeasure processing and the like. The sections will hereinafter specifically be described.

Method of Collision Judgment

The judgment section 81 receives the detection signals of the acceleration sensor 101 and the abnormality detection sensor 72 to judge the presence of the collision of the vehicle S based on two received detection signals. The judgment section 81 judges that the collision is "present" in a case where the acceleration detected by the acceleration sensor 101 exceeds a predetermined threshold value. At this time, the judgment section 81 sets a threshold value (hereinafter referred to as the "judgment threshold value") for use in this collision judgment in accordance with the presence of abnormality generated in the fuel cell system 1, that is, the detection signal of the abnormality detection sensor 72.

Specifically, during the traveling of the vehicle S, the detection signals of the acceleration sensor 101 and the abnormality detection sensor 72 are appropriately input into the judgment section 81. At this time, the judgment section 81 judges, from the detected value of the abnormality detection sensor 72, the presence of abnormality generated in the fuel cell system 1, and sets the judgment threshold value to be compared with the detected value of the acceleration sensor 101 by use of a correlation map shown in FIG. 3.

Figure 3:
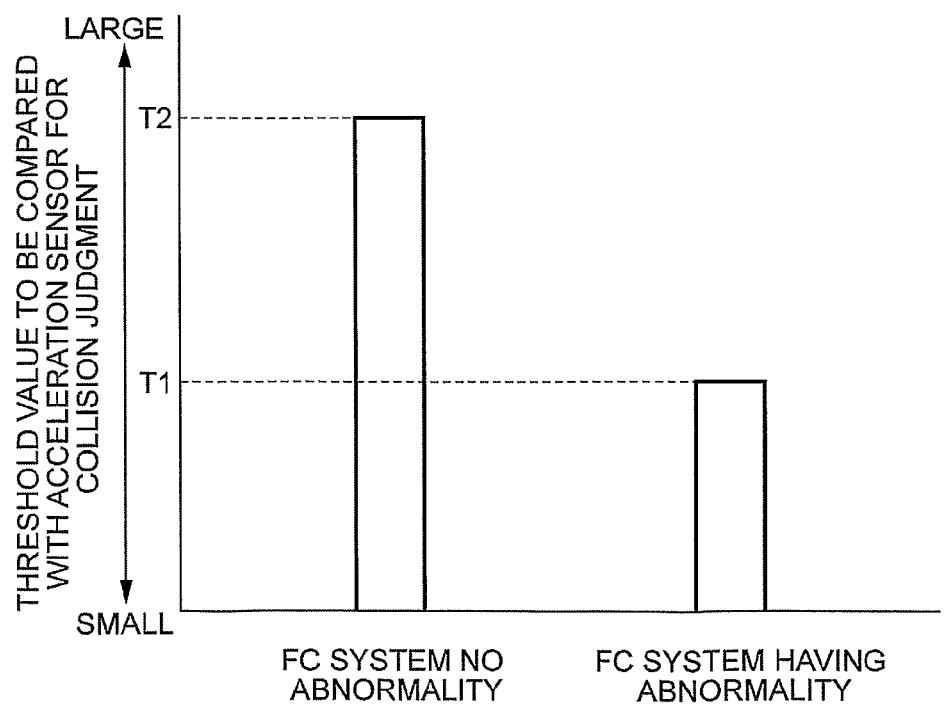
FIG. 3 is a schematic diagram showing threshold value setting in the collision judgment of the mobile body according to the embodiment.

FIG. 3 is a schematic diagram showing a method for setting the judgment threshold value of the acceleration sensor 101. The ordinate in FIG. 3 indicates the magnitude of the judgment threshold value of the acceleration sensor 101.

As shown in FIG. 3, in a case where it is judged that the abnormality is present in the fuel cell system 1, there is a high possibility that the collision is generated. In consequence, the judgment section 81 sets the judgment threshold value to a comparatively small threshold value T1. Here, examples of the case where it is judged that the abnormality is present in the fuel cell system 1 include a case where the decrease of the gas pressure due to the leakage of the reaction gas or the decrease of the water pressure due to the leakage of the cooling water occurs, and hence the detected value of the abnormality detection sensor 72 reaches a level indicating the generation of the abnormality in the fuel cell system 1.

On the other hand, in a case where the detected value of the abnormality detection sensor 72 has a level indicating the normality of the fuel cell system 1, there is a high possibility that any collision is not generated. Moreover, even when the detected value of the acceleration sensor 101 is a large value, there is a high possibility that the value is based on another factor such as road surface interference. Therefore, at this normal time, the judgment section 81 sets the judgment threshold value to a comparatively large threshold value T2.

Thus, according to the collision judgment method of the present embodiment, the detection result of the abnormality detection sensor 72 is considered in addition to the detection result of the acceleration sensor 101. In consequence, in the whole vehicle S, while the wrong judgment due to the road surface interference or the like is inhibited, the missing of the detection feared in a case where the threshold value is large can be inhibited. In particular, in a case where any abnormality of the fuel cell system 1 is not detected, the judgment threshold value is set to a large value, so that the influence of the road surface interference or the like can be eliminated, and the wrong judgment that the collision occurs can be inhibited. Moreover, in a case where the abnormality of the fuel cell system 1 is detected, the judgment threshold value is set to a small value, so that the missing of the detection feared in a case where the judgment threshold value is large can be inhibited.

Furthermore, the optimum judgment threshold value can be set based on the operation state of the fuel cell system 1, so that as compared with a case where the detected values of the acceleration sensor 101 and the abnormality detection sensor 72 are separately and independently used in the collision judgment, the accuracy of the collision judgment can be improved. Moreover, it is possible to prevent the wrong judgment in a case where one of the acceleration sensor 101 and the abnormality detection sensor 72 has a failure or the like. Therefore, the accuracy of the collision judgment can be improved.

Processing after Collision Judgment

A. Control of Airbag 102

The airbag control section 82 controls the operation of the airbag 102 based on the judgment result of the judgment section 81. Specifically, in a case where it is judged that the collision of the vehicle S is "absent", the airbag control section 82 maintains the contracted state of the airbag 102 as it is without developing the airbag. On the other hand, in a case where it is judged that the collision of the vehicle S is "present", the airbag control section 82 develops and expands the airbag 102.

Thus, the result of the collision judgment is used as a trigger for operating the airbag 102. Therefore, it can be prevented that the airbag 102 is wrongly operated although any collision is not generated. Moreover, at the collision, the airbag 102 can quickly and surely be operated.

B. Control of Fuel Cell System 1

The system control section 83 controls devices (the compressor 15, the pump 24, the shut valve 26, the purge valve 33, the high-voltage relays 65, 66, etc.) constituting the fuel cell system 1 based on the judgment result of the judgment section 81, whereby the operation of the fuel cell system 1 is controlled. Specifically, in a case where it is judged that the collision of the vehicle S is "absent", the system control section 83 continues the operation of the fuel cell system 1 based on the detection signals from various sensors.

On the other hand, in a case where it is judged that the collision of the vehicle S is "present", the system control section 83 stops the driving of the compressor 15 or closes the shut valve 26 to stop the supply of the oxygen gas or the hydrogen gas to the fuel cell 2. In consequence, any unnecessary reaction gas is not supplied to the fuel cell 2 and the leakage of the hydrogen gas or the like can be inhibited.

Also, in a case where it is judged that the collision is "present", the system control section 83 may open the purge valve 33 or stop the driving of the pump 24. Moreover, the system control section 83 may stop the operation of the fuel cell system 1 itself. Furthermore, the system control section 83 may block the high-voltage relay 66 to electrically block the fuel cell 2 from another electric system, or may block the high-voltage relay 65 to electrically block the battery 62 from the other electric system.

Timing to block the high-voltage relay 65 or 66 may appropriately be set. For example, this timing can be set to time after predetermined delay from the generation of the collision. In this case, the power from the fuel cell 2 or the battery 62 is supplied until the delay time elapses. In consequence, any passenger can perform a danger avoiding operation immediately after the collision.

Thus, the above collision judgment result is used as the trigger for stopping the supply of the reaction gas or stopping the supply of the power to a load device such as the traction motor 64. Therefore, the leakage of the reaction gas can surely be inhibited, or the short circuit of the power system 5 or the disconnection of wires or the like due to contact or the like can surely be inhibited. As the acceleration sensor 101 provided to operate the airbag 102 can also be used in collision countermeasure processing on the side of the fuel cell system 1, the number of the sensors to be installed can be decreased.

Modification

Instead of using the same trigger, different triggers may be used in performing a plurality of types of collision countermeasure processing such as the operation of the airbag 102 described above in the embodiment. For example, even in a case where it is judged that the collision is "present", a trigger for the operation of the airbag 102, a trigger for blocking high-voltage relays 65, 66 and a trigger for stopping hydrogen supply may be different from one another.

One detailed example will be described. As a threshold value to be compared with the detected value of an acceleration sensor 101, a threshold value which is the trigger for the operation of the airbag 102 is set to the smallest level, and a threshold value which is the trigger for blocking the high-voltage relays 65, 66 is set to the largest level. Moreover, a threshold value which is the trigger for stopping the hydrogen supply is set to an intermediate level between the above levels. The judgment section 81 compares these threshold values with the detected value of the acceleration sensor 101 to judge whether or not to execute the collision countermeasure processing. Then, the system control section 83 executes the collision countermeasure processing based on the judgment result.

The threshold value is set for each collision countermeasure processing in this manner, whereby the collision countermeasure processing judged to be executed by the judgment section 81 can be executed. In consequence, necessary collision countermeasure processing can be performed in accordance with the magnitude of the collision. For example, in a case where the threshold values are set as described above, when the collision is judged to be "present", the hydrogen supply can be continued while expanding the airbag 102 only.

It is to be noted that the threshold value to be set for each collision countermeasure processing has an arbitrary magnitude, but the threshold value as the trigger for the operation of the airbag 102 may relatively be smallest so that the above "A. Control of airbag 102" is performed in preference to "B. Control of fuel cell system 1". In consequence, the highest priority can be given to the protection of the passenger. Moreover, to quickly handle the hydrogen gas leakage, the threshold value for stopping the hydrogen supply may be smallest in the collision countermeasure processing on the side of the fuel cell system 1.

Another example will be described. A trigger for performing collision countermeasure processing on a fuel cell system 1 side may be changed in accordance with the detected value of another sensor (a third sensor) which detects the moving state of the vehicle S instead of the acceleration sensor 101. For example, when a vehicle speed is low, the stopping of hydrogen supply only is performed based on the detected value of a vehicle speed sensor (the third sensor). When the vehicle speed is high, the stopping of the hydrogen supply and the blocking of high-voltage relays 65, 66 may be performed.

Thus, the threshold value is set for each collision countermeasure processing with respect to the third sensor, and the collision countermeasure processing judged to be executed by the judgment section 81 is executed. In consequence, in a case where it is judged that the collision is "present", the necessary collision countermeasure processing can be performed in accordance with the moving state of the vehicle S. It is to be noted that even in this case, a relation between the threshold values (triggers) of the sensors in the collision countermeasures may be set to an arbitrary relation.

Second Embodiment

As described above, in the first embodiment, the collision judgment is performed from the detection results of the acceleration sensor 101 and the abnormality detection sensor 72. On the other hand, in a second embodiment, the collision judgment is performed from the detection results of the acceleration sensor 101 and another acceleration sensor 201 (see FIG. 1). It is to be noted that a constitution similar to that of the first embodiment is denoted with the same reference numerals, and detailed description thereof is omitted.

The acceleration sensor 201 is an acceleration sensor, which is a G-sensor, of the same type as that of the acceleration sensor 101, but is provided in a position different from that of the acceleration sensor 101 in the vehicle S. The acceleration sensor 201 is installed in, for example, the side part or rear part of the vehicle S, the vicinity of the fuel cell 2, the vicinity of the hydrogen tank 21 or the like. The detection signal of the acceleration sensor 201 is sent to the judgment section 81 of the controller 6.

The judgment section 81 judges the presence of the collision of the vehicle S based on two detection signals of the acceleration sensors 101 and 201. At this time, in accordance with, for example, the detected value (e.g., the detected value of the acceleration sensor 101) of one of the acceleration sensors 101 and 201, the judgment section 81 changes a judgment threshold value to be compared with the detected value (e.g., the detected value of the acceleration sensor 201) of the other sensor, to judge the presence of the collision.

One example will be described. During the traveling of the vehicle S before the collision, the detection signals of the acceleration sensors 101 and 201 are appropriately input into the judgment section 81, and the detected values of both the sensors are close to the threshold value. However, during the collision, the acceleration sensors 101 and 201 provided in the different positions may have different detected values of acceleration.

In view of this, for example, when the detected value of the acceleration sensor 101 exceeds the threshold value, there is a high possibility that the collision is generated. Therefore, the judgment section 81 sets the judgment threshold value to be compared with the detected value of the other acceleration sensor 201 to a comparatively small threshold value (e.g., T1 of FIG. 3). On the other hand, when the detected value of the acceleration sensor 101 is the threshold value or less, there is a high possibility that any collision is not generated. At this time, even when the detected value of the other acceleration sensor 201 is large, there is a high possibility that the value is based on another factor such as road surface interference. Therefore, in this case, the judgment section 81 sets the judgment threshold value to be compared with the detected value of the acceleration sensor 201 to a comparatively large threshold value (e.g., T2 of FIG. 3).

Therefore, according to the collision judgment method of the second embodiment, an optimum threshold value can be set based on the positions where the acceleration sensors 101, 201 are arranged. In consequence, as compared with a case where the detected values of the acceleration sensors 101, 201 are separately and independently used in the collision judgment or a case where one acceleration sensor is used, the influence of the road surface interference or the like can be eliminated, and the missing of the detection can be inhibited. Accordingly, the accuracy of the collision judgment can be improved. As processing in a case where it is judged that the collision is "present", the expansion of an airbag 102 can appropriately be executed, and the wrong operation or defective operation of the airbag 102 can be inhibited.

It is to be noted that in the second embodiment, a fuel cell system 1 does not necessarily have to be mounted on the vehicle S. However, when the system 1 is mounted, as countermeasure processing after collision, the above "B. Control of fuel cell system" can be executed. In this case, as described above in the modification, triggers for performing a plurality of types of collision countermeasure processing may be varied.

INDUSTRIAL APPLICABILITY

The vehicle S according to the present invention is applicable to a mobile body other than a two-wheeled or four-wheeled car, for example, a train, an airplane, a ship or a self-propelled robot.

The invention claimed is:

1. A mobile body having a fuel cell system, comprising:
a first sensor which detects a physical quantity concerning the moving state of the mobile body;
a second sensor which detects a physical quantity concerning the operation state of the fuel cell system; and
a controller including a judgment section, the controller programmed to receive detection signals from the first sensor and the second sensor and being programmed to judge the presence of the collision of the mobile body based on the two detection signals with the judgment section,
wherein the judgment section is programmed to change a threshold value to be compared with the detected value of the first sensor in accordance with the detected value of the second sensor, to judge the presence of the collision of the mobile body.

2. The mobile body according to claim 1, wherein the judgment section is programmed to use a first threshold value as the threshold value to be compared with the detected value of the first sensor in a case where the detected value of the second sensor is a value indicating the abnormality of the fuel cell system, whereas the judgment section is programmed to use a second threshold value larger than the first threshold value as the threshold value to be compared with the detected value of the first sensor in a case where the detected value of the second sensor is a value indicating the normality of the fuel cell system.

3. The mobile body according to claim 1, further comprising:
an airbag; and
an airbag control section which controls the operation of the airbag, the airbag control section expanding the airbag in a case where the judgment section judges that the collision of the mobile body is present.

4. The mobile body according to claim 1, the controller further comprising:
a system control section which controls the operation of the fuel cell system,
wherein when the judgment section is programmed to judge that the collision of the mobile body is present, the system control section being programmed to execute at least one of the following types of processing of:
(a) stopping the operation of the fuel cell system;
(b) stopping the supply of reaction gas to a fuel cell in the fuel cell system; and
(c) electrically blocking the fuel cell in the fuel cell system from another electric system.

5. The mobile body according to claim 1,
wherein when the judgment section is programmed to judge that the collision of the mobile body is present, the controller including a system control section being programmed to execute at least one of the following plurality types of processing:
(a) stopping the operation of the fuel cell system;
(b) stopping the supply of reaction gas to a fuel cell in the fuel cell system; and
(c) electrically blocking the fuel cell in the fuel cell system from another electric system;
wherein the judgment section is programmed to compare the detected value of the first sensor with the threshold value which varies in accordance with each of the plurality of types of processing, to judge whether or not to execute each type of processing, and
the system control section executes the processing which is judged to be executed by the judgment section.

6. The mobile body according to claim 1, further comprising:
a third sensor which is a sensor other than the first sensor and which detects a physical quantity concerning the moving state of the mobile body; and
wherein when the judgment section is programmed to judge that the collision of the mobile body is present, the controller including a system control section being programmed to execute at least one of the following plurality types of processing:
(a) stopping the operation of the fuel cell system;
(b) stopping the supply of reaction gas to a fuel cell in the fuel cell system; and
(c) electrically blocking the fuel cell in the fuel cell system from another electric system;
wherein the judgment section is programmed to compare the detected value of the third sensor with the threshold value which varies with each of the plurality of types of processing, to judge whether or not to execute each type of processing, and
the system control section executes the processing which is judged to be executed by the judgment section.

7. The mobile body according to claim 1, wherein the first sensor is an acceleration sensor which detects the acceleration of the mobile body.

8. The mobile body according to claim 1, wherein the second sensor is
a gas pressure sensor which detects the pressure of reaction gas flowing through a gas pipe in the fuel cell system;
a gas concentration sensor which detects the concentration of reaction gas in the fuel cell system; or
a water pressure sensor which detects the pressure of cooling water flowing through a cooling pipe in the fuel cell system.

* * * * *